United States Patent
Kurian et al.

(10) Patent No.: US 10,009,235 B2
(45) Date of Patent: Jun. 26, 2018

(54) MESSAGING QUEUE SPINNING ENGINE

(71) Applicant: Bank of America Corporation, Charlotte, NC (US)

(72) Inventors: Manu Kurian, Dallas, TX (US); Sorin N. Cismas, Southlake, TX (US); Kalpesh Patel, Morganville, NJ (US); Ray A. Edwards, Charlotte, NC (US); Dan L. Dilday, Virginia Beach, VA (US); Anne Donne, Manakin Sabot, VA (US); Jawad Ayesh, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 247 days.

(21) Appl. No.: 14/960,969

(22) Filed: Dec. 7, 2015

(65) Prior Publication Data
US 2017/0163494 A1   Jun. 8, 2017

(51) Int. Cl.
G06F 15/16   (2006.01)
H04L 12/24   (2006.01)
H04L 29/08   (2006.01)
H04L 12/725  (2013.01)
H04L 12/863  (2013.01)

(52) U.S. Cl.
CPC ........ *H04L 41/5022* (2013.01); *H04L 45/306* (2013.01); *H04L 47/625* (2013.01); *H04L 67/1008* (2013.01)

(58) Field of Classification Search
CPC . H04L 41/5022; H04L 45/306; H04L 47/625; H04L 67/1008
USPC ......................... 709/206, 226, 238
See application file for complete search history.

(56) References Cited

U.S. PATENT DOCUMENTS

| | | | |
|---|---|---|---|
| 2004/0260745 A1* | 12/2004 | Gage ................ | H04L 29/12009 709/200 |
| 2011/0113142 A1* | 5/2011 | Rangegowda .... | H04L 29/12971 709/227 |
| 2015/0142978 A1* | 5/2015 | Anderson .......... | H04L 41/5019 709/226 |

* cited by examiner

*Primary Examiner* — Wing F Chan
*Assistant Examiner* — Joseph Maniwang
(74) *Attorney, Agent, or Firm* — Banner & Witcoff, Ltd.; Michael A. Springs (57) ABSTRACT

Systems are provided for using a message spinning engine to create and/or manage messaging queues in a distributed network using virtualized servers. An abstraction layer formed by virtualized servers may enable the message spinning engine to seamlessly transition messaging queues while minimizing the likelihood of exceeding the parameters of existing service level agreements. The message spinning engine may include a service mapping module to maintain mappings between source business applications and virtualized servers, a product bridge to implement message encapsulation for communication between different messaging queue products, and a messaging queue monitoring console to analyze performance and capacity of physical services and messaging services and accordingly adjust levels of service for source business applications.

16 Claims, 3 Drawing Sheets

MESSAGING QUEUE SPINNING ENGINE

BACKGROUND

Organizations, such as corporate entities, educational institution, governmental agencies, and/or other large enterprise organizations, may use messaging queues in conjunction with distributed applications. These organizations may provide different types of messaging queues that may be defined as having one or more different levels of service. However, currently, messaging queues are fully or partially tied to the particular server on which they are installed, making it extremely difficult to seamlessly transition messaging queues from one server or group of servers to another. As such, transitioning messaging queues can be time consuming, inefficient, and error-prone. Further, messaging queues in transition are unavailable and thus increase the likelihood of Service Level Agreement (SLA) violations. As such, a need has been recognized to efficiently transition messaging queues while minimizing the likelihood of SLA violations.

SUMMARY

In light of the foregoing background, the following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

An illustrative example described herein provides a message spinning engine. The message spinning engine may include at least one processor, and memory storing computer-readable instructions, that when executed by the at least one processor, may cause a message spinning queue to receive a message from a source business application, where the message may specify at least a recipient business application as a target location. The message spinning queue may then determine whether a mapping exists between the source business application and a first virtual server. The first virtual server may, for example, include a load balancer, may be attributed to a first service level agreement, and may be communicatively coupled to a first cluster of one or more messaging services. The one or more messaging services may reside on one or more physical hosts. If a mapping exists, the message spinning engine may route the message to the load balance of the first virtual server specified in the mapping. The message spinning engine may then select a messaging server from the first cluster of one or more messaging services based on a load balancing algorithm, a health check, or any combination. The message spinning engine may then route the message to the recipient business application via the selected messaging service. The message spinning engine may provide an interface through which the source business application may be transitioned to a second service level agreement. Further, the message spinning engine may generate a performance and capacity report on the hosts and messaging services in the distributed network.

Another illustrative aspect described herein may provide a message spinning engine, which may include at least one processor and a non-transitory memory storing computer-readable instructions. The computer-readable instructions may, when executed by the at least one processor, may cause the message spinning engine to receive a message from a source business application, where the message may specify at least a recipient business application as a target location. The source business application may be associated with a service level agreement. Accordingly, the message spinning engine may identify a host on which to spin a new messaging service, based at least in part on the service level agreement of the source business application. The message spinning engine may add the new messaging service to a cluster. The cluster may be communicatively coupled to a virtual server. The virtual server may be attributed to the service level agreement, and may include a load balancer. The message spinning engine may create a mapping between the source business application and the virtual server, and may route the message to the recipient business application via the new messaging service via the load balancer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, entities, such as corporations, government entities, universities, and the like, often implement messaging queues in order to enable communication between distributed business applications in a distributed network. In doing so, these entities may provide various types of messaging queue platforms, such as enterprise application integration (EAI) or service-oriented architecture (SOA), open source enterprise service buses (ESBs), message brokers, web service integration, JMS-based messaging systems, proprietary platforms, and the like. In some cases, the various messaging queue platforms have different system requirements. For example, the various messaging queue platforms may have different minimum hardware specifications (e.g., processing power, memory, secondary storage, adapters, peripherals, and the like) and/or minimum software specifications (e.g., operating system, APIs, drivers, other applications, and the like). Further, the various messaging queue platforms may require the host server to be configured differently. Even further, entities may offer messaging queues at different levels of service, for example, based on availability or delivery requirements specified in service level agreements (SLAs). As such, consumers with higher tier service level agreements (e.g., those expecting higher availability, faster delivery times, and/or the like) may be tied to higher-performance servers and/or messaging queue instances, and consumers with lower tier service level agreements (e.g., those expecting lower availability, slower delivery times, and/or the like) may be tied to lower-performance servers and or messaging queue instances.

In some cases, a messaging queue, and therefore the consumer of the messaging queue, may be transitioned to a different server or groups of servers. In some examples, this transition may be due to one or more of planned downtime, unanticipated underperformance, or overutilization of a host server. In other examples, the consumer may elect to be transitioned to a messaging queue associated with either a higher level (e.g., tier) or a lower level service level agreement. In some cases, the system may analyze a consumer's usage of the messaging queues and determine that a messaging queue associated with either a higher tier or lower tier service level agreement may be more appropriate based on one or more reasons such as a history of use. Such a determination may ensure that the resources of the enterprise system are effectively allocated.

Transferring consumers of the service-oriented applications from one message queue platform to another different message queue platform may involve locating a server having the necessary system requirements, installing an appropriate messaging queue, configuring the server to host the messaging queue, and/or initializing a new instance of the messaging queue. Moreover, one or more components of the enterprise network may need to be reconfigured such that the consumer is now tied to the new server (i.e., bound to the IP address of the new server). Such a process may be time-consuming, inefficient, and may also lead to redundancy, mistakes, or other inaccuracies. Accordingly, the devices and systems described herein may relate to systems for spinning messaging queues to allow for seamless transitions using virtualized environments. Some or all of the aspects of the systems and arrangements described herein may be performed automatically, as will be discussed below.

Figure 1:
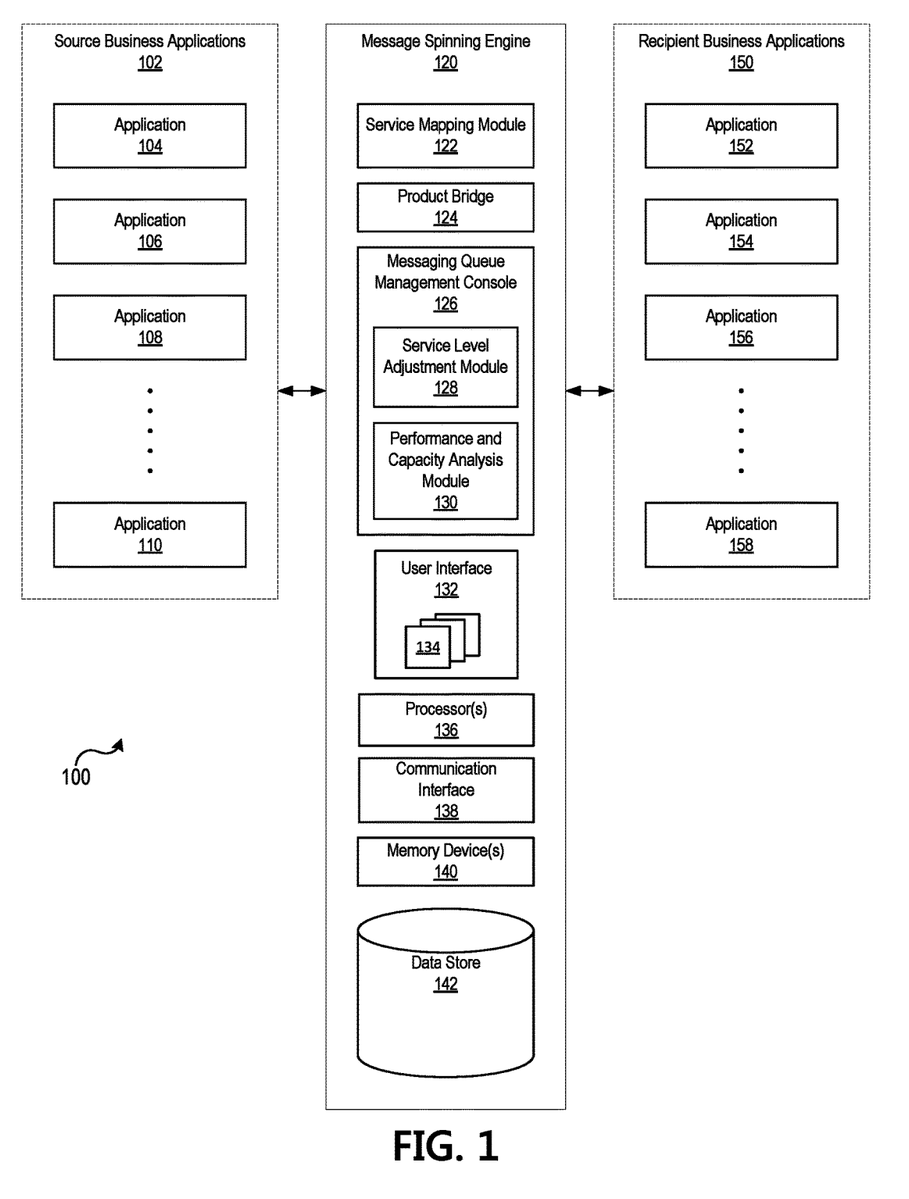
FIG. 1 is a block diagram of an illustrative networked computing system including an example message spinning engine in accordance with one or more aspects described herein.

FIG. 1 shows an illustrative networked computing system 100 (e.g., a message spinning system) including a message spinning engine 120, according to one or more aspects of the present disclosure. An entity may implement a message spinning engine 120 to enable communication between distributed business applications, for example, between source business applications 102 and recipient business applications 150. The source business applications 102 and the recipient business applications 150 may be implemented on one or more computer servers. In this example, the source business applications 102 and the recipient business applications 150 may each be a subset of the business applications in the entity's distributed network. As such, the source business applications 102 may include none, some, or all of the same business applications as the recipient business applications 150.

The message spinning engine 120 may include various components, modules, and sub-systems to support enabling communication between source business applications 102 and recipient business applications 150 through virtualized messaging queues, creating and maintaining mappings between source business applications and virtual servers associated with a cluster of hosts that include a messaging queue service, providing a product bridge to implement message encapsulation for communication between different messaging queue products, and providing a messaging queue console through which the message spinning engine 120 may adjust the level of service for source business applications 102 or analyze the performance and capacity of the mapped hosts and services. The message spinning engine 120, in this example, includes a service mapping module 122, a product bridge 124, and a messaging queue monitoring console 126, a user interface 132, a non-transitory memory device storing one or more user interface screens 134, one or more processors 136, a communication interface 138, one or more memory devices 140, and a data store 142. Further, in this example, the messaging queue monitoring console 126 includes a service level adjustment module 128 and a performance and capacity reporting module 130. The message spinning engine 120 may be implemented using a special purpose computing device (or computing devices) that have been specially configured to perform functionality according to one or more aspects of the present disclosure.

The one or more processors 136 (e.g., microprocessor, microcontroller, and the like) of the message spinning engine 120 may operate by using an algorithm that facilitates communication between source business applications 102 and recipient business applications 150 through virtualized messaging queues, creates and maintains mappings between source business applications and virtual servers associated with a cluster of hosts including a messaging queue service, provides a product bridge to implement message encapsulation for communication between different messaging queue products, and provides a messaging queue console through which the message spinning engine 120 may adjust the level of service for source business applications 102 or analyze the performance and capacity of the mapped hosts and services. This algorithm may be included as instructions stored in the one or more memory devices 140 and may be included as a portion of the service mapping module 122, the product bridge 124, and/or the messaging queue monitoring console 126. The one or more processors 136, for example, may operate by receiving and delivering a message from a source business application 104-110 to be sent to a recipient business application 150-158. In another example, the one or more processors 136 may operate by receiving and executing instructions to transition a source business application 104-110 to a different messaging queue via the messaging queue monitoring console 126. An illustrative algorithm will be described below with reference to FIG. 3.

In an example, the one or more processors 136 may be configured to operate the algorithm and/or the service mapping module 122, the product bridge 124, and/or the messaging queue monitoring console 126 using an operating system (e.g., Windows, Linux, Unix, GNU, OS X, iOS, Android, and the like). In some cases, the memory devices 140 may be communicatively coupled to the one or more processors 136, such as via a data bus. The one or more memory devices 140 may be used to store any desired information, such as the aforementioned algorithm, a lookup table, computer executable instructions to implement the business rules for enabling virtualization of messaging queues, and/or the like. The one or more memory devices 140 may be any suitable type of storage device including, but not limited to, RAM, ROM, EPROM, flash memory, a hard drive, and the like. In some examples, the one or more processors 136 may store information within the one or more memory devices 140, and may subsequently retrieve the stored information.

The communication interface 138 of the message spinning engine 120 may facilitate communication between the message spinning engine 120, the source business applications 102, and the recipient business applications 150 via a network using one or more wired or wireless communication links. The message spinning engine 120 may communicate, via the one or more wired or wireless communication links over the network, with one or more source business applications 104-110 and one or more recipient business applications 150-158. For example, the message spinning engine 120 may include one or more computing devices that may be communicatively coupled to a network. The network may be communicatively coupled to one or more devices, such as to servers associated with the one or more source business applications 104-110 and/or the one or more recipient business applications 150-158. The network may include one or more wired and/or wireless networks, such as a telecommunications network (e.g., a cellular network, a land line network, a cable network, a telecommunications network, and the like), a Wi-Fi network, a local area network (LAN), a wide area network (WAN), the Internet, and the like. When used in LAN networking environment, the message spinning engine 120 may be connected to the LAN through a network interface or an adapter that may be included as a portion of the communication interface 138. When used in a WAN networking environment, the message spinning engine 120 may include a modem and/or other means for establishing wired and/or wireless communication over the WAN, such as the Internet. It will be appreciated that the network connections discussed are illustrative and other means of establishing a communications link between the message spinning engine 120, the source business applications 102, and the recipient business applications 150 may include one or more various protocols such as TCP/IP, Ethernet, FTP, HTTP and the like.

The source business applications 102 may communicate with the recipient business applications 150 via the message spinning engine 120 by providing one or more message parameters. In some examples, message parameters may simply include a message and a target location. In other examples, communication via the message spinning engine 120 may include additional or alternative parameters, such as a message priority (e.g., Urgent, High, Medium, Low), a message type (e.g., command message, document message, event message, and so forth), a request-reply indicator, a return address, a message expiration timestamp, a message format, and the like. Further, parameters may be designated as either required or optional. Based on these parameters, the message spinning engine 120 may determine how to efficiently route the message from the source business applications 102 to the recipient business applications 150.

The data store 142 (e.g., a database) of the message spinning engine 120 may be used to store information related to the system requirements of the source business applications 102 and recipient business applications 150. For example, the data store 142 may store information corresponding to the SLAs associated with each of the source business applications 102 and recipient business applications 150. Additionally or alternatively, the data store 142 may store system requirements for each of the source business applications 102 and recipient business applications 150. Further, the data store 142 may be used to store a list of available virtual servers 220, wherein each virtual server 222-226 may be attributed to one or more configurations or characteristics. Even further, the data store 142 of the message spinning engine 120 may be used to store information related to mappings between source business applications 102 and one or more virtual servers. For instance, each source business application 102-108 may be mapped to a same virtual server or each source business application 102-108 may be mapped to one or more different virtual servers. The source business applications 102-108 may each be identified by an IP address and port combination (e.g., aaa.bb.cc.dd:ee). Additionally or alternatively, the source business applications 102-108 may be identified by a domain name to be resolved by a Domain Name Server (DNS) within the entity's network. To achieve seamless transitions between messaging queues, the virtual server may be identified by a domain name to be resolved by a DNS within the entity's network. It should be noted that even in examples where the data store 142 stores an IP address and port combination for a virtual server in addition to a domain name, the message spinning engine 120 will primarily rely on the domain name to ensure seamless transitions in case of physical relocation. As such, in these examples, the message spinning engine 120 may update the IP address and port combination for a virtual server in response to a physical relocation of the server. The mappings between source business applications 102 and virtual servers may be based on whether the SLA and/or other system requirements of a source business application are compatible with the configurations or characteristics of a virtual server. Additionally, in some examples, the data store 142 may also store persistence information for one or more of the mappings. As such, the data store 142 may maintain information relevant to determining server affinity. The message spinning engine 120 may utilize this information in determining which message queuing service to use, as described in further detail below in reference to FIGS. 2 and 3.

Additionally, in some cases, the data store 142 may be store computer-executable instructions to cause a computing device (e.g., the service mapping module 122, the product bridge 124, the messaging queue monitoring console 126, and the like) to enable communication between source business applications 102 and recipient business applications 150 through virtualized messaging queues, create and maintain mappings between source business applications and virtual servers associated with a cluster of hosts including a messaging queue service, provide a product bridge to implement message encapsulation for communication between different messaging queue products, and provide a messaging queue console through which the message spinning engine 120 may adjust the level of service for source business applications 102 or analyze the performance and capacity of the mapped hosts and services.

In some embodiments, the message spinning engine 120 may include other inputs and/or outputs (I/O). The I/O may include a data port (e.g., a wireless port) that may be configured for communication using a protocol, such as a Bluetooth™, Wi-Fi 33, Zigbee or any other wireless protocol. In other cases, the data port may be a wired port such as a serial port, an ARCNET port, a parallel port, a serial port, a CATS port, a Universal Serial Bus (USB) port, and/or the like. In some cases, the data port of the I/O may use one or more communication protocols, such as Ethernet, and the like, that may be used via a wired network or a wireless network. In some instances, the I/O may include a USB port and may be used to download and/or upload information from a USB flash drive or something other data source. Other remote devices may also be employed, as desired.

The I/O may be configured to communicate with the one or more processors 136 and may, if desired, be used to upload information for use by the one or more processors 136 and/or download information from the one or more processors 136. Information that can be uploaded and/or downloaded may include, for example, values of operating parameters, configurations (e.g., server configurations, application configurations, user configurations, and the like), business rules, documents, lookup tables, and the like. In some instances, the I/O may be used to upload a configuration for a previously-created messaging queue, thereby optimizing the process of inputting system requirements for a new messaging queue. In some cases, the I/O may be used to download data stored within the memory devices 140 and/or the data store 142. For example, the I/O may be used to download performance and capacity reports generated by the messaging queue monitoring console 126 of the message spinning engine 120. In another example, the I/O may be used to download the mappings between virtual servers and source business applications 102 generated by the server mapping module 122 of the message spinning engine 120. In such examples, the data may be downloaded to a device such as a USB memory stick (also sometimes referred to as a thumb drive, flash drive, or jump drive), a personal computer, tablet computer, a PDA, a smart phone, or other device, as desired. In some cases, the data may optionally be convertible to a different format or presentation (e.g., a spreadsheet, a text document, plain text, XML file, published document, and the like) from the format as maintained within the memory devices 140 and/or the data store 142 to aid interpretability.

The user interface 132 of the message spinning engine 120 may be a user interface device that permits the message spinning engine 120 to display information and/or solicit information, as well as accept one or more user interactions with a user. For example, the user interface 132 may permit a user to enter system requirements to create a new message queue. In another example, the user interface 132 may permit a user to identify a messaging queue instance for which the user would like to generate a performance and capacity report. In yet another example, the user interface 132 may permit a user to transition a source business application to a higher or lower SLA. In some cases, the user interface 132 may include a display and a distinct keypad. In some cases, the user interface 132 may include a display and a virtual keypad. A display may be any suitable display. In some instances, the display may include or may be a liquid crystal display (LCD), and in some cases a fixed segment display or a dot matrix LCD display. If desired, user interface 132 may be a touch screen LCD panel that functions both as a display and a keypad. In some instances, a touch screen LCD panel may be adapted to solicit information from a user and/or receive such information. The user interface 132 may be adapted to display one or more user interface screens 134. For example, the message spinning engine 120 may be configured to solicit and/or present information to a user via the one or more user interface screens 134, such as displaying the current status of creating a new messaging queue per the user-specified system requirements, displaying a performance and capacity report for a specific messaging queue instances, and/or the like.

Example implementations of the service mapping module 322, the product bridge 324, and the messaging queue monitoring console 326 as illustrated in FIG. 1 will be described in further detail below with reference to FIG. 2-3. Further, as noted above, these modules are described by way of example only and other implementations of a message spinning engine 120 may include additional or alternative components, modules, sub-systems, and so forth.

Figure 2:
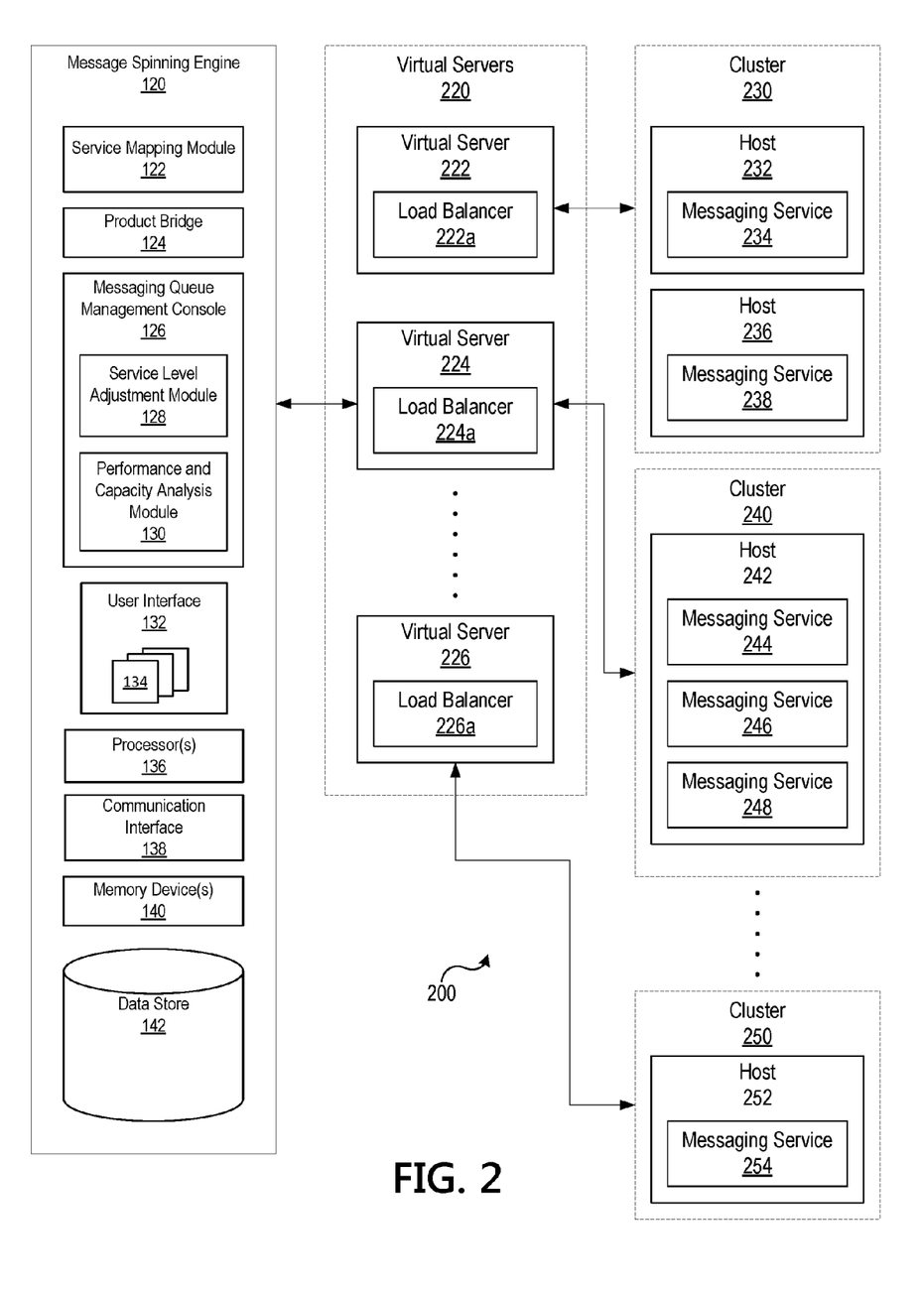
FIG. 2 is a block diagram of an illustrative implementation of a message spinning engine with respect to virtualized messaging queues in accordance with one or more aspects described herein.

Referring now to FIG. 2, a block diagram 200 of an illustrative implementation of a message spinning engine with respect to virtualized messaging queues. The message spinning engine 120 may be communicatively coupled to one or more virtual servers 220. The communication interface 138 of the message spinning engine 120 may facilitate communication between the message spinning engine and the one or more virtual servers 220. In some examples, the virtual servers 222-226 may also include a communication interface similar to the one described with reference to FIG. 1.

The one or more virtual servers 220 represent an abstraction layer of the messaging queues available to the source business applications 102. As such, the message spinning engine 120 communicates with the one or more virtual servers 220 rather than the individual messaging queues. The virtual servers 220 may be identified by an IP address and port combination (e.g., 666.77.88.99:11). Further, the virtual servers 220 may be identified by a domain name to be resolved by a DNS within the entity's network. The virtual servers 220 are application neutral, and as such, do not host the messaging queues therein. However, each virtual server 222-226 may be attributed to one or more configurations or characteristics. For instance, virtual server 222 may be attributed to a first type and/or brand of message queue, whereas virtual server 224 may be attributed to a second type and/or brand of message queue. In some cases, the virtual servers 220 may be attributed to a range or set of characteristics. For example, virtual server 224 may be attributed to a more demanding Service Level Agreement (SLA), whereas virtual server 226 may be attributed to a less demanding SLA. For instance, virtual server 224 may guarantee a higher SLA availability (e.g., greater than about 99%, greater than about 95%, and less than about 99%, or the like), a lower SLA latency (e.g., sub-millisecond latency, or the like), a higher SLA throughput (e.g., greater than about 10,000 requests per second), and the like. In another example, a virtual server may be attributed to all open source ESBs, on the basis that many open source ESBs may require similar host configurations and have similar message formats.

Based on the configurations or characteristics attributed to a virtual server, the virtual server may be communicatively coupled to a matching cluster. In some examples, a virtual server 222-226 may be communicatively coupled to a minimum of zero clusters and a maximum of one cluster. A cluster, also referred to as a pool or a farm, is a collection of similar services (e.g., message queueing services). As such, a cluster may include one or more hosts, wherein each host may include one or more messaging queues. Thus, each virtual server is communicatively coupled to a cluster of one or more messaging queues which are running on one or more hosts (e.g., the host 232 of the cluster 230, and the like). In the example illustrated in FIG. 2, virtual server 220 is communicatively coupled with two messaging services 234 and 238, where the messaging services 234 and 238 are running on different hosts 232 and 236. In another example illustrated in FIG. 2, virtual server 224 is communicatively coupled with three messaging services 244, 246, and 238, all of which are running on the same host 240. It will be appreciated that the arrangements shown in FIG. 2 and discussed herein are illustrative and other means of communicatively coupling one or more virtual servers to one or more messaging services may be used, including combinations of the examples discussed above.

In some examples, the virtual server may be embodied within the cluster. As such, the message spinning engine 120 may maintain mappings between the source business applications 102 and the clusters.

Load balancing via the abstraction or virtualization layer, including virtual servers and clusters, increases the likelihood that an entity meets its SLAs. Specifically, the clusters 230, 240, and 250 may enable load balancing between the various available messaging queues. As such, each virtual server 222-226 may also include a load balancer 222*a*-226*a*. A load balancer may make decisions as to which messaging queue in the cluster to send the message from the source business application. Additionally, a load balancer may monitor the performance and capacity of the messaging services in its cluster, and thereby may maintain a list of currently available messaging queues in its cluster. In some cases, the virtual server or load balancer may include one or more memory devices or one or more data stores to store the list of currently available messaging queues. To maintain the accuracy of the list, the load balancer may perform monitoring in response to particular events or at various intervals. In some examples, the load balancer may monitor its cluster upon receiving a request to route a message (i.e., the monitoring is triggered by the request). In other examples, the load balancer may monitor its cluster periodically (e.g., every minute, every hour, every day, and the like). In yet other examples, the load balance may monitor its cluster upon receiving a request to do so via the performance and capacity reporting module 130 of the message spinning engine 120. Other examples that trigger monitoring may include system restarts or downtime.

As used in this description, a host (or a host server) is a physical server capable of running one or more services (e.g., message queueing services). A host may be identified by an IP address (e.g., aaa.bb.cc.dd). A host may receive traffic directly from the load balancers 222*a*-226*a*. A host may include one or more services, each of which may be identified by the combination of the host's IP address and a port number (e.g., aaa.bb.cc.dd:ee). As such, each application running on the host can be uniquely identified by its port number. The port number thus may enable the load balancer to communicate with a messaging service directly via a TCP port of the service.

Figure 3:
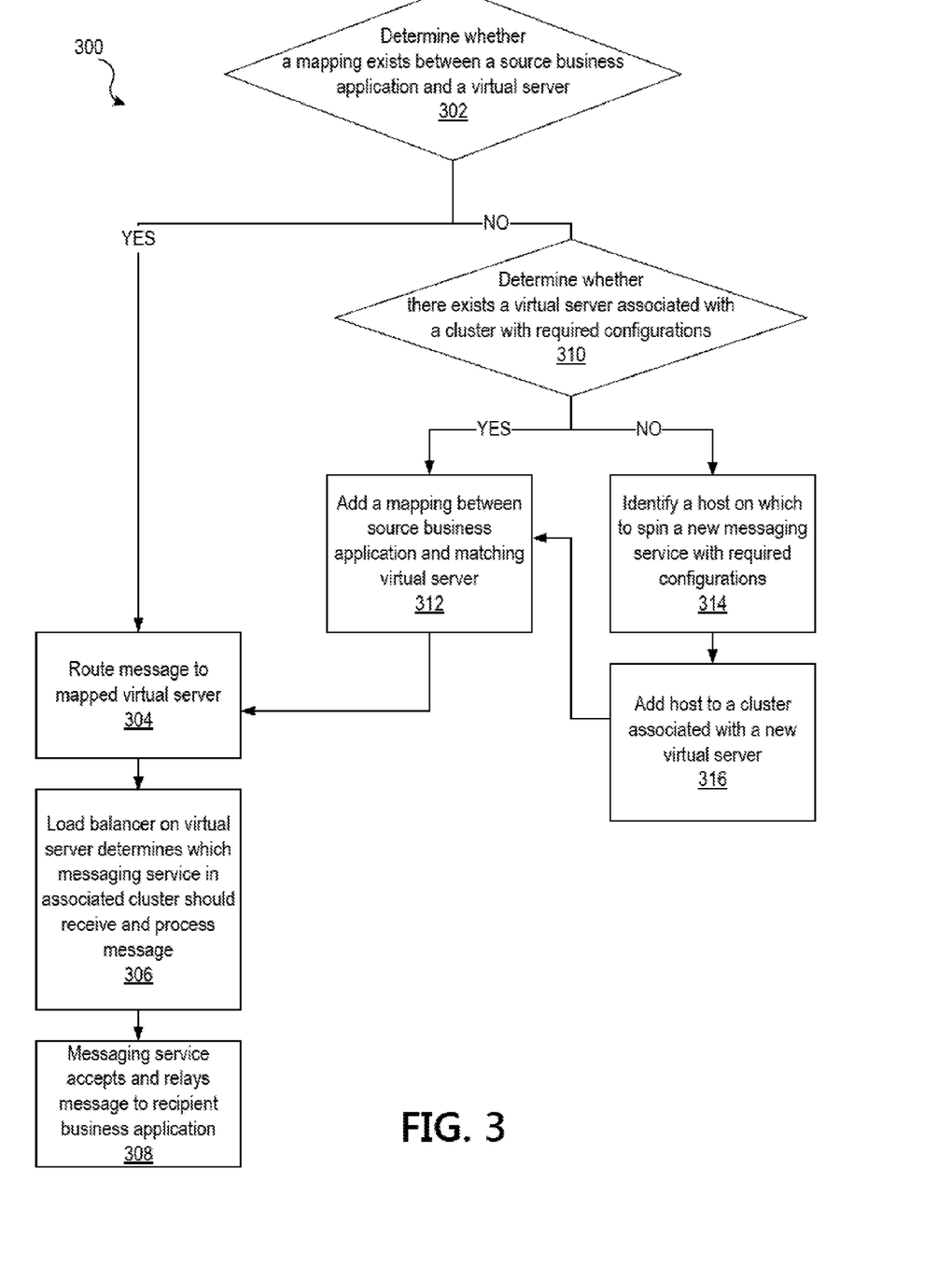
FIG. 3 is a flowchart of an illustrative method for creating and managing messaging queues in a networked computing system in accordance with one or more aspects described herein.

Referring now to FIG. 3, a flowchart 300 of an illustrative method for creating and managing messaging queues in a networked computing system is shown. The various components of the message spinning engine 120 may be used to perform these method steps. The message spinning engine 120 may be configured to, in operation, receive a message from a source business application 104-110. In some examples, the communication from the source business application 104-110 may be received via the communication interface 138 of the message spinning engine 120. The message may include at least a message and a target location (i.e., a recipient business application 152-158). Additionally, the message may include a message priority, a message type, a request-reply indicator, a return address, a message expiration timestamp, a message format, and the like, as discussed herein.

The service mapping module 122 of the message spinning engine 120 may be configured, in operation, to determine whether there exists a mapping between the source business application 104-110 and at least one of the virtual servers 220 at 302. In one example, the service mapping module 122 may query the data store 142 to obtain a list of the current mappings between the source business applications 102 and the virtual servers 220. Specifically, the service mapping module 122 may query the data store 142 by the domain name, the IP address, or a combination of the IP address and port number of the source business application.

In some embodiments, as described above, a message from a source business application 104-110 may include additional or alternative parameters, including, but not limited to, a message priority, a message type, a request-reply indicator, a return address, a message expiration timestamp, a message format, and the like. While in some examples, the message spinning engine 120 may simply use the message and target location to route a message through an appropriate virtual server, in other examples, the message spinning engine 120 may also consider one or more other parameters included in a message. As such, the data store 142 may include one or more mappings for each source business application 104-110 based on one or more other parameters. For example, where a message includes a message priority, a source business application may be routed to a first virtual server attributed to a higher SLA for an urgent priority message, whereas the same source business application may be routed to a second virtual server attributed to a lower SLA for a medium priority message. In another example, where the message includes an expiration timestamp, the message spinning engine 120 may select a virtual server attributed to a faster delivery time to ensure message is delivered before the expiration timestamp.

In cases where the query returns at least one result for the source business application, there already exists a mapping between the source application and at least one of the virtual servers 220. Thus, at 304, the message spinning module may route the message from the source business application to the mapped virtual server.

In some cases, the system requirements of one or more of the source business applications 102 may differ from the system requirements of one or more of the recipient business applications 150. In such cases, the product bridge 124 of the message spinning engine 120 may be configured to, in operation translate the message received from the source business application such that it can be received and processed by the recipient business application. For example, where the source business application and the recipient business application may expect messages in a different format, the product bridge 124 may encapsulate the message from the source business application to conform to the format expected and/or required by the recipient business application. Thus, use of the product bridge 124 in the message spinning engine 120 advantageously eliminates the need to spin and execute separate messaging services for every message format. Further, the product bridge 124 may advantageously increase the types of source business applications and recipient business applications that can communicate via the message spinning engine 120, as the message spinning engine 120 may be offer an array of messaging services with various requirements, various formats, various SLAs and/or tiers, and so forth.

At 306, the load balancer (e.g., the load balancer 222*a*, 224*a*, and/or 226*a*) on the selected virtual server may be configured to, in operation, determine which messaging service in its matching cluster should receive and process the message. Further, the load balancer may update the message to include the IP address and port number combination of the selected messaging service, instead of the domain name of the virtual server. In making a selection, the load balancer may rely on a performance and capacity on one or more of the messaging services in its matching cluster. As such, the load balancer may verify (e.g., via a health check) that a host or messaging service is available and has sufficient capacity to process the message per the requirements of the SLA. In some examples, the load balancer may trigger a new performance and capacity via the messaging queue monitoring console 126. In other examples, the load balancer may rely on a report published by most recent performance and capacity conduct by the messaging queue monitoring console 126. Additionally or alternatively, the load balancer may perform an independent evaluation of the health of the messaging services in its cluster. For instance, the load balancer may ping the IP address of each host in its matching cluster. Where a host does not respond to the ping, it will be considered unavailable. Further, the load balancer may ping the messaging service itself by pinging the combination of the IP address and port number associated with the message service. Where the message service does not respond to the ping, it will be considered unavailable. Accordingly, the load balancer may generate a list of available message services in its cluster, wherein the list includes the one or more message services that provided a response to the one or more pings. Where the list of available message services includes only one message service, the load balancer will select that message service. Alternatively, where the list of available message services includes more than one message service, the load balancer may use a variety of algorithms to select a message service. For instance, the load balancer may pick the message service with the fastest ping response in order to minimize latency. In some examples, the fastest ping response and/or minimum latency may be based on the geographical location of the messaging service. Other selection algorithms may be based on host and/or message service connection counts, host and/or message service utilization. Alternatively, the load balancer may use a round-robin approach on the list of available message services.

At 308, the selected messaging service may then be configured to, in operation, receive and accept the message from the load balancer, and route the message to the recipient business application 152-158 designated in the message.

Alternatively, in cases where the health check by the load balancer returns no available messaging services, the virtual server may be configured to, in operation, vary its response based on the SLA of the source business application. For instance, where the SLA only requires a low degree of certainty, the virtual server may drop the message. In other examples, where the SLA requires a higher degree of certainty, the virtual server may instruct the load balancer to perform the health evaluation again after a predetermined time period. In yet other examples, the virtual server may notify the message spinning engine 120 of its inability to deliver the message per the requirements of the SLA. In such examples, the message spinning engine 120 may be configured to identify another virtual server that meets the SLA of the source business application. As such, the message spinning engine 120 may need to spin a new messaging service on a new host with the required configurations (i.e., skip to 314 of FIG. 3). The process of spinning a new messaging service will be described in further detail below. Additionally, the service mapping module 122 of the message spinning engine 120 may remove from the data store 142 any mappings between the source business application and the unsuccessful virtual server.

In examples where the service mapping module 122 determines that there is no existing mapping between the source business application and a virtual server, the service mapping module 122 may be configured to, in operation, determine where there exists a virtual server associated with a cluster of services with the required configurations (block 310). In particular, the service mapping module 122 may determine whether there exists a virtual server attributed to the configurations or characteristics required by the SLA of the source business application. In one example, the service mapping module 122 may query the data store 142 by the SLA requirements of the source business application. At 312, where a virtual server in the list of available virtual servers in the data store 142 matches the query, the server mapping module may add a new mapping between the source business application and the matching virtual server. Once the mapping is added, steps 304, 306, and 308 may be executed as described above.

In cases where the service mapping module 122 is unable to find an existing mapping or an existing virtual server, the message spinning engine 120 may identify a host on which to spin a new messaging service with the required configurations at 314. In some examples, the message queue monitoring console 126 may be configured to, in operation, identify a new host and spin a new messaging service. In such examples, the message queue monitoring console 126 may request a set of system requirements for the host, for instance, via the user interface 132 of the message spinning engine 120. The set of system requirements may be based at least on the messaging queue platform to be spun. Additionally or alternatively, the set of system requirements may be based on the SLA associated with the source business application. As such, the message queue monitoring console 126 may attempt to identify one or more hosts including at least the system requirements. The message queue monitoring console 126, or the message spinning engine 120 generally, may maintain a list of active hosts and a corresponding set of system requirements. For instance, the list may be stored in the data store 142 or the one or more memory devices 140. The message spinning engine 120 may use health checks, similar to those described above, to maintain a list of available hosts. Alternatively or additionally, such a list may be maintained within the distributed network but outside of the message spinning engine 120. Once an appropriate physical server or host is identified, the messaging queue monitoring console 126 may spin (e.g., install, configure, execute, and so forth) a new messaging queue on the host.

After the message queue monitoring console 126 has completed spinning the new messaging queue, the message queue monitoring console 126 may trigger the service mapping module 122 of the message spinning engine 120 to add the new host and messaging service to a new cluster, whereby the cluster is associated with a new virtual server at 316. The new virtual server may also include a load balancer component. As such, the service mapping module 122 may add a new mapping to the data store 142 between the new virtual server and the IP address and port number combination of the new messaging service. Thus, the new virtual server may be communicatively coupled to the new cluster as its matching cluster. Once the mapping is added, steps 304, 306, and 308 may be executed as described above.

The messaging queue monitoring console 126 of the message spinning engine 120 may provide a dashboard via the user interface 132. The dashboard may be configured to, in operation, request user input to trigger the performance and capacity reporting module 130 and/or the service level adjustment module 128.

The performance and capacity reporting module 130 of the messaging queue monitoring console 126 may be configured to, in operation, generate a report on the performance and capacity of the currently mapped hosts and messaging services. For instance, the report may include the performance and capacity of all of the hosts and messaging services currently included in at least one mapping in the data store 142. The generation of such a report may be triggered via the user interface 132 of the message spinning engine 120. Alternatively, the generation of such a report may be triggered periodically by the messaging queue monitoring console 126 (e.g., every minute, every hour, every day, and the like). The report may include one or more metrics indicating the performance and capacity of a host and/or messaging service. For instance, the one or more metrics may include CPU utilization, memory utilization, disk I/O utilization, process monitoring (e.g., number of processes running, number of blocked processes, number of waiting processes, executions per second, and so forth) network utilization, configuration metrics, and the like. It will be appreciated that the list of metrics is not exhaustive, and may include additional or alternative metrics. Additionally, the list of metrics may be based on the operating system of the host. The performance and capacity reporting module 130 may retrieve these values directly from the hosts and/or messaging services. Alternatively, each host and/or messaging service may include a health monitor that tracks the performance and capacity of the particular host and/or messaging service. As such, the performance and capacity reporting module 130 may either query the health monitors of the various hosts and/or messaging services, or alternatively, receive periodic updates from the health monitors of the various hosts and/or messaging services.

Based on the one or more metrics indicating performance and capacity of a host, the performance and capacity reporting module 130 may determine whether a host and/or messaging service is available. The determination may be based on the SLA, and/or other characteristics or configurations, associated with the cluster including the host and/or messaging service. As such, in some examples, the performance and capacity reporting module 130 may define thresholds for availability based on SLA requirements. For instance, a higher tier SLA may be tied to lower thresholds, and a lower SLA may be tied to higher thresholds. To illustrate, a first messaging service having a CPU utilization of 60% may be considered available when included in a cluster associated with a lower service level agreement. However, a second messaging service having a CPU utilization of 60% may be considered unavailable when included in a cluster associated with a higher service level agreement.

In cases where the performance and capacity reporting module 130 determines that a host and/or messaging service is unavailable, at least with reference with the SLA associated with the cluster, the messaging queue monitoring console 126 may initiate a transition of the host and/or messaging service. In examples where the messaging queue monitoring console 126 determines that a messaging service does not meet a higher tier SLA, the messaging queue monitoring console 126 may determine whether the messaging service is capable of meeting a lower SLA. As such, the messaging queue monitoring console 126 may transition the messaging queue from a first cluster associated with first virtual server attributed to a higher tier SLA to a second cluster associated with a second virtual server attributed to lower SLA. The messaging queue monitoring console 126 may then remove the transitioned messaging service from the list of available services of the load balancer of the first virtual server. The messaging queue monitoring console 126 may also add the transitioned messaging service to the list of available services of the load balancer of the second virtual server. Since the source business applications 102 are communicatively coupled to the virtual servers via the message spinning engine 120, and not to the hosts and/or messaging services directly, such a transition is seamless and causes minimal disruption to the functioning of the distributed system.

In some examples, the messaging queue monitoring console 126 may allow pending messages to be processed through a messaging service prior to initiating a transition. This may be advantageous to reduce data loss. The messaging queue monitoring console 126 may also remove the host and/or messaging service from the first cluster associated with the first virtual server prior to initiating a transition, in order to block incoming messages.

The service level adjustment module 128 may be configured to, in operation, adjust the level of service associated with a source business application 104-110. For instance, a source business application may grow in need to require a higher tier SLA. Such an adjustment may require transitioning the source business application from a virtual server attributed to a lower SLA to another virtual server attributed to a higher tier SLA. The adjustment may be initiated via the user interface 132 of the message spinning engine 120. The user interface 132 may enable the user to specify the new SLA and/or any additional or alternative configurations. In another example, a source application may be not be using all of the capabilities provided by a higher tier SLA, and therefore may cut costs by moving to a lower tier SLA. Such an adjustment may require transitioning the source business application from a virtual server attributed to a higher tier SLA to another virtual server attributed to a lower SLA. Similarly, a source application may be exceeding the limits of its SLA, and may need to be transitioned to a higher tier SLA. This determination may be based, at least in part, on a performance and capacity report. In these examples, the service level adjustment module 128 may then communicate with the service mapping module 122 to remove any existing mappings including the source business application. The service level adjustment module 128 may then follow the method steps illustrated in FIG. 3, starting from 302, to create a mapping between the source business application and a new virtual server attributed to the adjusted level of service.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure. For example, while some embodiments refer to message queueing services, the disclosure is meant to include, as appropriate, using virtualization to support other applications used by entities in distributed networks (e.g., filed-based communication, web services, business process management applications, and the like).

What is claimed is:

1. A message spinning engine, comprising:
at least one processor; and
memory storing computer-readable instructions, that when executed by the at least one processor, cause the message spinning engine to:
receive a message from a source business application, wherein the message specifies at least a recipient business application as a target location, wherein the source business application is associated with a service level agreement;

identify a host on which to spin a new messaging service, based, at least in part, on the service level agreement;

add the new messaging service to a cluster, wherein the cluster is communicatively coupled to a virtual server, wherein the virtual server is attributed to the service level agreement, and wherein the virtual server includes a load balancer;

create a mapping between the source business application and the virtual server; and route the message to the recipient business application via the new messaging service via the load balancer.

2. The message spinning engine of claim 1, wherein the instructions, when executed by the at least one processor, further cause the message spinning engine to:

identify a host on which to spin a new messaging service, based, at least in part, on the service level agreement, one or more system requirements of the new messaging service, or a combination thereof.

3. A message spinning engine, comprising:

at least one processor; and memory storing computer-readable instructions, that when executed by the at least one processor, cause the message spinning engine to:

receive a message from a source business application, wherein the message specifies at least a recipient business application as a target location;

determine whether a mapping exists between the source business application and a first virtual server, wherein the first virtual server includes a load balancer, wherein the first virtual server is attributed to a first service level agreement;

responsive to determining that at least one mapping exists, route the message to the load balancer of the first virtual server specified in the mapping;

select a messaging service from a first cluster of one or more messaging services based on a load balancing algorithm, a health check, a latency evaluation, a geographical location, or a combination thereof;

route the message to the recipient business application via the selected messaging service;

receive a second message from a second source business application, wherein the second message specifies at least a second recipient business application as a second target location, wherein the second source business application is associated with a second service level agreement;

identify a second existing virtual server, based, at least in part, on the second service level agreement, such that the second existing virtual server is also attributed to the second service level agreement, wherein the second existing virtual server is communicatively coupled to a second cluster of one or more messaging services, and wherein the second existing virtual server includes a second load balancer;

create a second mapping between the second source business application and the second existing virtual server;

route the second message to the second load balancer of the second existing virtual server;

select a second messaging service from the second cluster of one or more messaging services based on a second load balancing algorithm, a second health check, or a combination thereof; and route the second message to the second recipient business application via the second selected messaging service.

4. The message spinning engine of claim 3, wherein the one or more messaging services of the second cluster reside on one or more physical hosts.

5. The message spinning engine of claim 4, wherein the second health check is based, at least in part, on one or more pings to Internet Protocol addresses of the one or more messaging services of the second cluster.

6. The message spinning engine of claim 3, wherein the second load balancing algorithm is based, at least in part, on service connection counts, service utilization, or a combination thereof.

7. A method of routing messages through a distributed network, comprising:

receiving a first message from a source business application, wherein the message specifies at least a recipient business application as a target location, wherein the source business application is associated with a service level agreement;

identifying a host on which to spin a new messaging service, based, at least in part, on a first service level agreement;

adding the new messaging service to a first cluster, wherein the first cluster is communicatively coupled to a first virtual server, wherein the first virtual server is attributed to the first service level agreement, and wherein the first virtual server includes a load balancer;

creating a mapping between the source business application and the first virtual server; and routing the first message to the recipient business application via the new messaging service via the load balancer.

8. The method of claim 7, further comprising:

identifying a host on which to spin a new messaging service, based, at least in part, on the service level agreement, one or more system requirements of the new messaging service, or a combination thereof.

9. A method of claim 7, further comprising:

receiving a second message from the source business application, wherein the message specifies at least the recipient business application as the target location;

determining whether a mapping exists between the source business application and the first virtual server;

responsive to determining that at least one mapping exists, routing the message to the load balancer of the first virtual server specified in the mapping;

selecting a messaging service from the first cluster of one or more messaging services based on a load balancing algorithm, a health check, or a combination thereof; and routing the second message to the recipient business application via the selected messaging service.

10. The method of claim 9, wherein the first virtual server is communicatively coupled to the first cluster of one or more messaging services, and wherein the one or more messaging services reside on one or more physical hosts.

11. The method of claim 10, wherein the health check is based, at least in part, on one or more pings to Internet Protocol addresses of the one or more messaging services of the first cluster.

12. The method of claim 9, wherein the load balancing algorithm is based, at least in part, on service connection counts, service utilization, or a combination thereof.

13. A method of claim 7, further comprising:

receiving a second message from a second source business application, wherein the second message specifies at least a second recipient business application as a second target location, wherein the second source business application is associated with a second service level agreement;

identifying a second existing virtual server, based, at least in part, on the second service level agreement, wherein the second existing virtual server is attributed to the second service level agreement, wherein the second existing virtual server is communicatively coupled to a second cluster of one or more messaging services, and wherein the second existing virtual server includes a second load balancer;

creating a second mapping between the second source business application and the second existing virtual server;

routing the second message to the second load balancer of the second existing virtual server;

selecting a second messaging service from the second cluster of one or more messaging services based on a second load balancing algorithm, a second health check, or a combination thereof; and routing the second message to the second recipient business application via the selected second messaging service.

14. The method of claim 13, wherein the one or more messaging services of the second cluster reside on one or more physical hosts.

15. The method of claim 14, wherein the second health check is based, at least in part, on one or more pings to Internet Protocol addresses of the one or more messaging services of the second cluster.

16. The method of claim 13, wherein the second load balancing algorithm is based, at least in part, on service connection counts, service utilization, or a combination thereof.

* * * * *